United States Patent [19]
Aoki

[11] 3,786,725
[45] Jan. 22, 1974

[54] HYDRAULIC TYPE MOLD CLAMPING DEVICE

[76] Inventor: Katashi Aoki, 6037, Oaza Minamijo, Sakaki-machi, Japan

[22] Filed: July 5, 1972

[21] Appl. No.: 268,992

[30] Foreign Application Priority Data
July 10, 1971  Japan.............................. 46/51277

[52] U.S. Cl.................. 91/411 A, 60/97 H, 60/425
[51] Int. Cl............................................ F15b 11/18
[58] Field of Search ............91/411 A, 411 R, 399; 60/97 H, 383, 425

[56] References Cited
UNITED STATES PATENTS

| | | | |
|---|---|---|---|
| 1,843,082 | 1/1932 | Ferris et al................... | 60/97 H UX |
| 2,157,240 | 5/1939 | Keel.............................. | 60/97 H UX |
| 2,519,900 | 8/1950 | Geiger et al.................. | 91/411 A X |
| 2,916,205 | 12/1959 | Litz................................ | 60/97 H X |
| 3,170,379 | 2/1965 | Dempster...................... | 60/97 H X |

Primary Examiner—Edgar W. Geoghegan

[57] ABSTRACT

A mold clamping device of hydraulic type having a mold clamping cylinder including a mold clamping piston coupled through a ram portion thereof to a movable plate for supporting a movable mold, and a high-speed mold shifting cylinder including a mold shifting piston associated with said mold clamping piston through a rod portion thereof, according to the invention, said device further comprising a passage interconnecting two chambers formed at both sides of said mold clamping piston in said mold clamping cylinder, and a valve located in said passage for opening and closing the passage in accordance with the operation of the mold clamping device, while said two chambers are connected to hydraulic lines through portions of said passage at corresponding sides of said valve.

5 Claims, 16 Drawing Figures

HYDRAULIC TYPE MOLD CLAMPING DEVICE

BACKGROUND OF THE INVENTION

This invention relates to an improvement in a mold clamping device of a hydraulic pressure type.

In the conventional direct pressure type mold clamping mechanisms having a high-speed mold shifting piston and a high-pressure mold clamping piston coupled directly to each other and included in a high-speed mold shifting cylinder and a high-pressure mold clamping cylinder, respectively, when these pistons directly coupled are shifted to either a mold closing or opening direction at a high speed under the operation of the high-speed mold shifting piston and cylinder in combination, the fluid flowing in or out of the high-pressure mold clamping cylinder having a larger diameter than the high-speed cylinder is forced to pass through narrow passages at a high speed, thus creating a negative pressure in a chamber within the high-pressure cylinder at one side of the high-pressure mold clamping piston. The negative pressure thus created in a chamber in the high-pressure mold clamping cylinder will, furthermore, be intensified whenever the shifting speed of the mold becomes faster, and the fluid stored in an oil reservoir (this reservoir may be located at any position in this device) is thereby caused to be absorbed into the chamber at a negative pressure.

The absorption of the fluid into the negative pressure chamber causes creation of bubbles in the fluid, or expansion of the bubbles already existing in the fluid.

At a high-pressure mold clamping operation, if the fluid including bubbles is pressurized at one side chamber in the high-pressure mold clamping cylinder, a quantity of fluid sufficient for compensating the volumes of the bubbles must be supplied before the establishment of a required pressure in the chamber, and the operation period required in effectuating the high-pressure mold clamping will be commensurately lengthend. This eliminates the possibility of shortening, for instance, an injection molding cycle, and the creation of bubbles and expansion and contraction thereof have been one reason for deteriorating the operational fluid.

SUMMARY OF THE INVENTION

Therefore, a primary object of the present invention is to provide an improved mold clamping device wherein all of the above described drawbacks of the conventional mold clamping mechanisms have been substantially eliminated.

Another object of the invention is to provide an improved mold clamping device wherein the creation of a negative pressure in the high-pressure mold clamping cylinder is substantially prevented, and any possibility of causing bubbles is thereby eliminated.

Still another object of the invention is to provide an improved mold clamping device whereby slow-down distances at the times of mold clamping and mold opening are equalized between each other.

These and other objects of the present invention can be achieved by an improved mold clamping device of hydraulic type having a mold clamping cylinder including a piston coupled to a movable plate for supporting a mold through a ram portion thereof and a high-speed mold shifting cylinder including a piston associated with the mold clamping piston, both of the cylinders being arranged in an axial direction of the device, said device further comprising a passage interconnecting two chambers in the mold clamping cylinder, and a valve adapted to close the passage when it is required, whereby the mold clamping cylinder is connected to hydraulic lines of the device through the passage.

The nature, principle, and the utility of the present invention will be better understood from the following detailed description of the invention when read in conjunction with the accompanying drawings wherein like parts or members are designated by like reference numerals or characters.

DETAILED DESCRIPTION OF THE INVENTION

Figure 1:
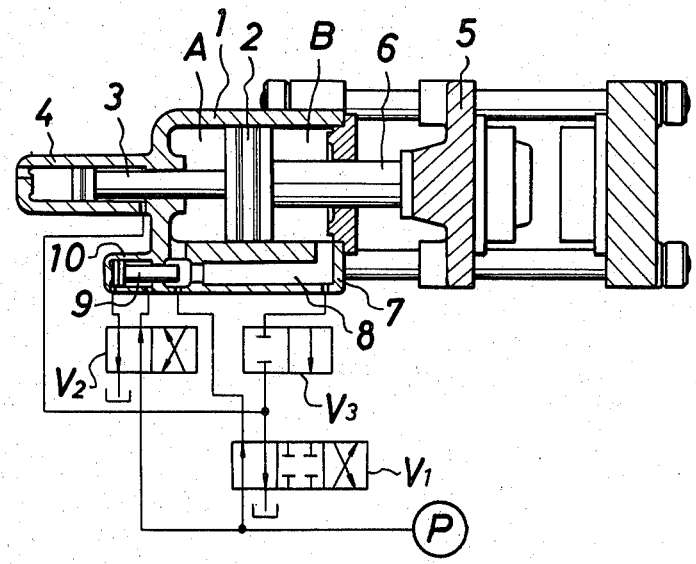
FIGS. 1 through 4 are sectional views showing a mold clamping device constituting an embodiment of the present invention.
Figure 2:
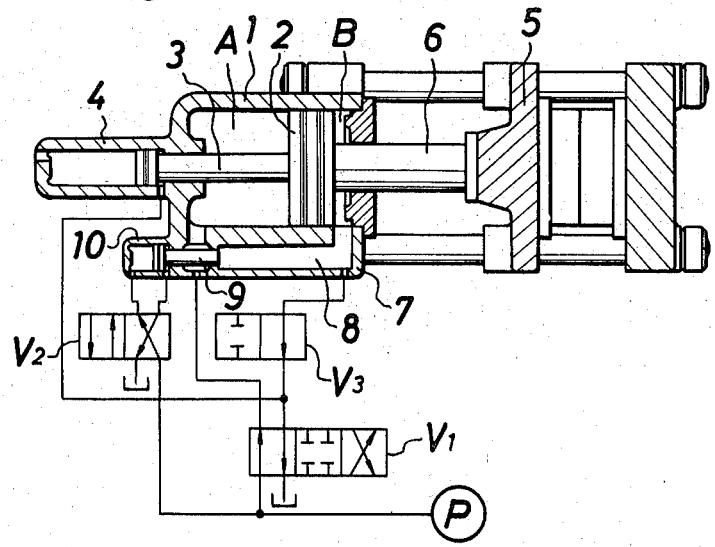

Referring now to FIGS. 1 through 4 showing an embodiment of the invention, there is indicated a mold clamping cylinder 1 including a mold clamping piston 2 therein, and a high-speed mold shifting cylinder 4 provided rearwardly of the mold clamping cylinder 1 and including a high-speed mold shifting piston 3 integrally coupled to the mold clamping piston 2. The interior of the mold clamping cylinder 1 is divided by the piston 2 into two chambers A and B, and the piston 2 is extended at the side of the chamber B to be formed into a ram 6 coupled to a movable plate 5 for supporting the movable part of the metal molds.

A cylindrical member 7 is further provided along the side wall of the mold clamping cylinder 1, and oil passage 8 is provided within the cylindrical member 7 for communicating the two chambers A and B. At a side near the chamber A of the oil passage 8, a valve cylinder 10 of a plunger valve 9 is provided for closing the passage 8 and guiding the fluid into the chamber A, and two fluid lines are connected to the two end portions of the passage 8 separated by a valve seat of the plunger valve 9.

A hydraulic circuit for operating the above-mentioned three cylinders 1, 4, and 10 comprises a valve VI of three positions, four way type for supplying the pressurized fluid from a hydraulic pump P to the high-speed mold shifting cylinder 4 and to the mold clamping cylinder 1 through the oil passage 8, a valve V2 of two positions, four way type for supplying the pressurized fluid to the valve cylinder 10 of the plunger valve 9 for operating the same valve 9, and a shut-off valve V3 connected to a pipe line leading to one end of the passage 8.

In the embodiment shown in FIGS. 1 through 4, the diameter of the ram 6 is selected to be greater than that of the rod portion of the piston 3 so that a difference is provided between the cross-sectional areas of the two chambers A and B. In this construction, when the plunger valve 9 is retracted as shown in FIG. 1 thereby to open the passage 8 communicating the two chambers A and B, the piston 2 is quickly shifted toward a direction closing the metal molds because of a pressure difference caused by the difference in the cross sectional areas of the two chambers A and B, whereby the high-speed closing operation of the mold clamping device constituting the first embodiment is carried out by the action of the mold clamping cylinder associated with the mold clamping piston. During this operation, the two chambers A and B are both maintained at a highest pressure of the hydraulic system.

When the valve V2 is thereafter operated to advance the plunger valve 9 thereby to close the oil passage 8 and the valve V3 is simultaneously operated with the valve V1 left as it is, the pressurized fluid is introduced into only the chamber A to perform a low-speed high-pressure mold clamping operation of the mold clamping device. In this case, only the chamber A is maintained at the high pressure of the hydraulic system.

Figure 3:
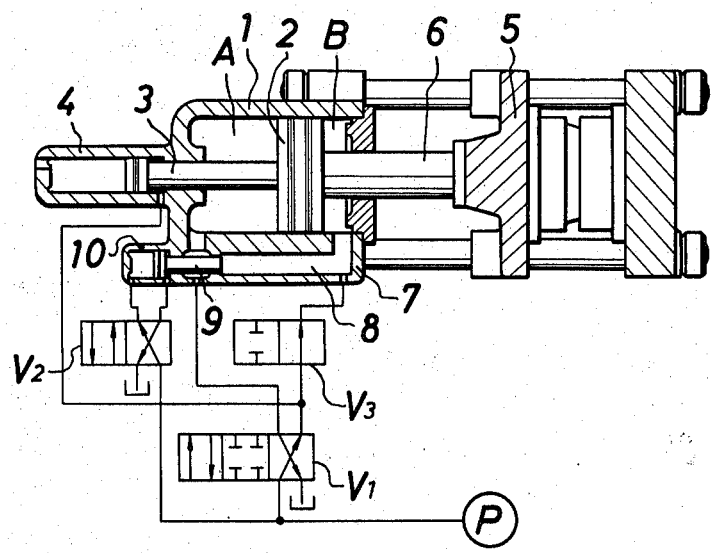

When the valves V1 and V3 are mould to their positions to introduce the pressurized fluid into the chamber B and the mold opening cylinder 4, as shown in FIG. 3, the piston 2 is retracted rearwardly at a low speed with the fluid in the chamber A being forced out of the chamber A through a fluid line into the oil reservoir, and the metal molds are opened under a strong force. In this case, the fluid pressure in the chamber B will be maintained at a value sufficient to compensate the initial mold-opening resistance of the metal molds.

Figure 4:
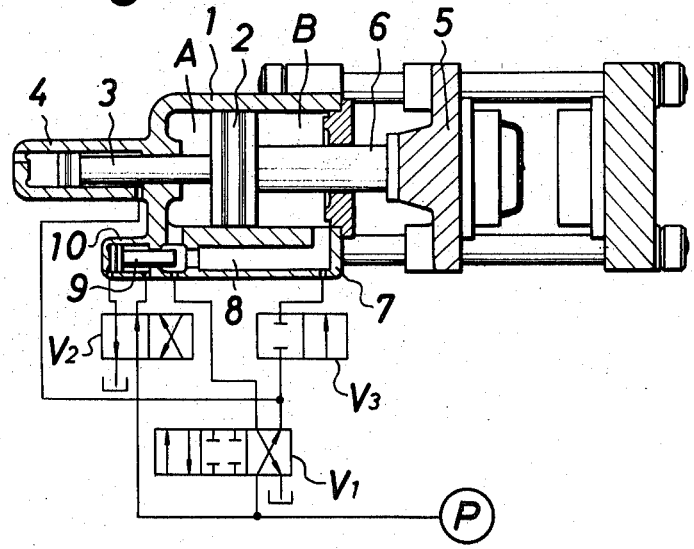

Thus, if the positions of the valves V2 and V3 are changed as shown in FIG. 4, thus retracting the plunger valve 9 to open the oil passage 8 so that the two chambers A and B are thereby communicated with each other, the fluid in the chamber A will be passed through the oil passage 8 to the chamber B, and any excessive amount of the fluid caused by the difference in the volumes of the chambers A and B will be returned to the oil reservoir. As a result, the resistance caused by the fluid in the chamber A will be removed, and the piston 2 will be retracted at a high-speed under the fluid pressure in the high-speed mold opening cylinder 4, through the cylinder 1, thereby to open the metal molds at a high speed.

In the second embodiment of the present invention shown in FIGS. 5 through 8, the diameter of the ram 6 is selected to be smaller than that of the rod portion, now acting as a piston 3 in the cylinder 4, so that the cross-sectional area of the chamber A is made smaller than that of the chamber B.

Furthermore, a hollow cylindrical space 3a is provided within the rod portion, acting as a piston 3, and a nozzle 4a having an oil passage therethrough is extended forwardly from the central portion of the rear wall of the cylinder 4 to be inserted into the hollow cylindrical space 3a. Thus, when a pressurized fluid is introduced into the cylindrical space 3a, which is functionally acting as a part of the high-speed mold shifting cylinder 4, through the nozzle 4a, the rod portion acting as a piston 3 is shifted forwardly at a high speed together with the integrally formed piston 2 and the ram 6 in a direction closing the metal molds. This type of construction of the high-speed mold shifting cylinder and piston in combination will be hereinafter called telescopic construction.

Since the operations of the principal members of the second embodiment are similar to those described in the first embodiment, detailed description thereof will be omitted, and these are described in brief with reference to FIGS. 5 through 8.

Figure 5:
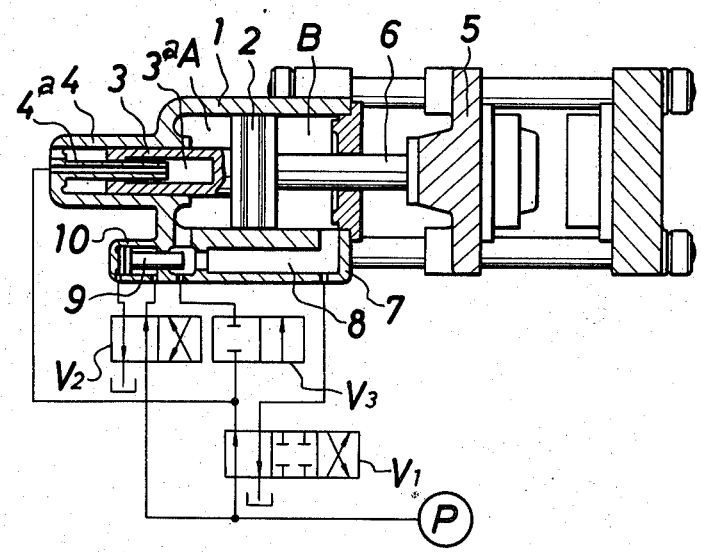
FIGS. 5 through 8 are sectional views showing a second embodiment of the invention.

In FIG. 5, there is indicated the high-speed mold closing stage of the operation, wherein pressurized fluid is introduced into the hollow cylindrical space 3a forming one chamber of the telescopically constructed high-speed mold shifting cylinder 4. The plunger valve 9 is retracted, and the chambers A and B are thereby communicated through the oil passage 8. As a result, the fluid in the chamber B is passed through the passage 8 to the chamber A, and because of the difference in the volumes of the two chambers, a part of the fluid in excess is returned into the oil reservoir.

Figure 6:
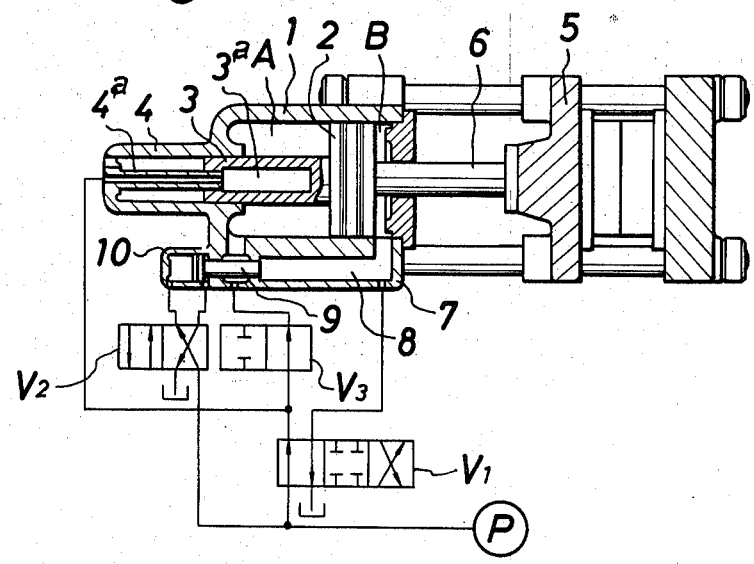

In FIG. 6, the plunger valve 9 is advanced to separate the two chambers A and B. Pressurized fluid is introduced only to the chamber A, and a low-speed high-pressure mold clamping operation is thereby performed (only the chamber A is maintained at a high pressure).

Figure 7:
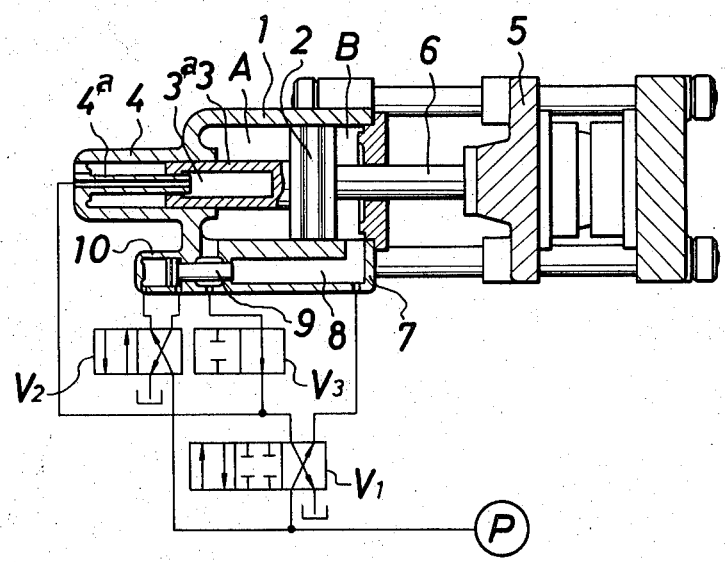

In FIG. 7, there is indicated a low-speed high-pressure mold opening operation wherein pressurized fluid is introduced into the chamber B with the device maintained in a condition indicated in FIG. 6 (although the pressure in the chamber B is somewhat elevated, the value corresponds to the resistance in initially opening the metal molds).

Figure 8:
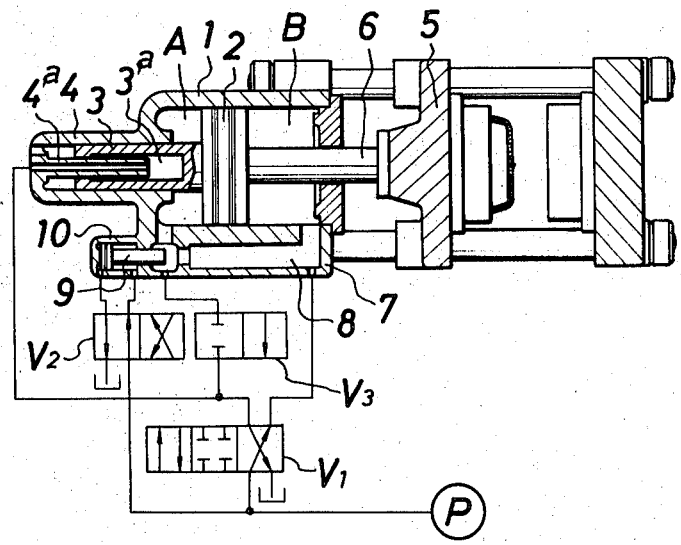

In FIG. 8, there is indicated a high-speed mold opening operation wherein the plunger valve 9 is retracted to communicate the two chambers A and B and pressurized fluid is introduced into the two chambers. Because of the difference in the cross sectional areas of the two chambers, the piston 2 is retracted at a high-speed (both of the two chambers are subjected to a high pressure).

The third embodiment of the present invention is indicated in FIGS. 9 through 12. In this embodiment, the diameters of the piston rod 3 and the ram 6 are equalized. The operation of this mold clamping device will now be described with reference to these figures.

Figure 9:
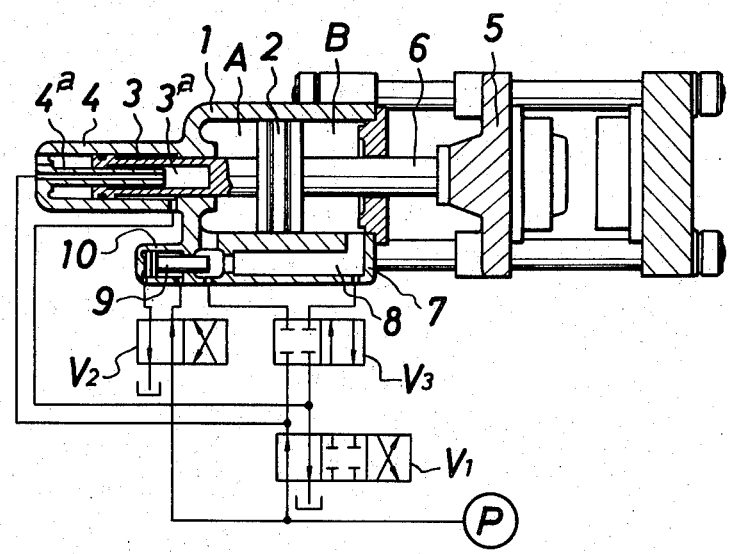
FIGS. 9 through 12 are sectional views showing a third embodiment of the invention.

In FIG. 9, there is indicated a high-speed mold closing operation, wherein the pressurized fluid is introduced into the hollow cylindrical space 3a now acting as a telescopically constructed high-speed mold closing cylinder. In this case, the plunger valve 9 is retracted thereby communicating two chambers A and B, so that the fluid in the chamber B is passed through the oil passage 8 to the chamber A, and the piston 2 is quickly shifted forwardly to close the metal molds.

Figure 10:
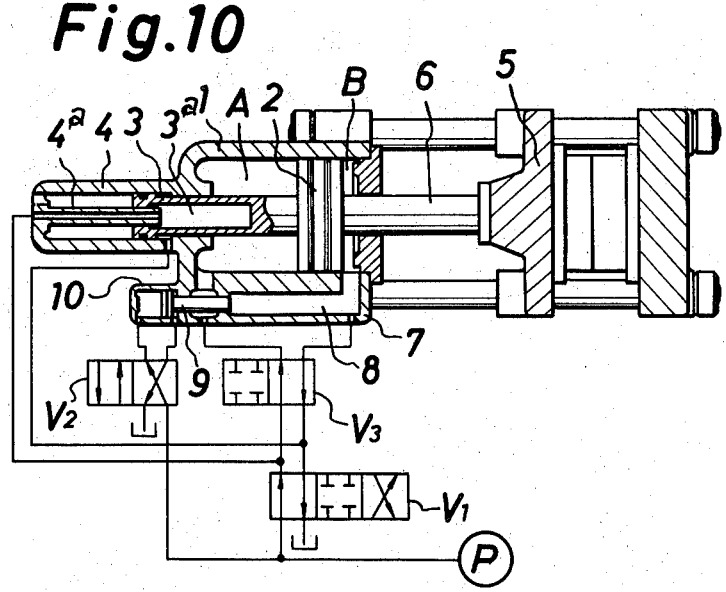

In FIG. 10, the plunger valve 9 is now advanced to close the oil passage 8, and the pressurized fluid is introduced into the chamber A, so that the metal molds are clamped by a strong pressure (only the chamber A subjected to a high pressure).

Figure 11:
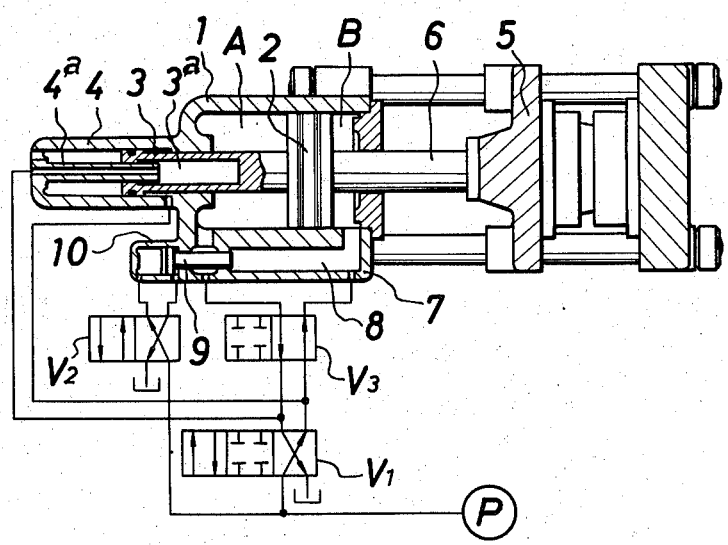

In FIG. 11, the pressurized fluid is now introduced into the chamber B and also to a forward chamber in the high-speed mold shifting cylinder 4, so that the metal molds are forced open (although the pressure in the chamber B is elevated, the value is not raised more than that corresponding to the resistive force in the initial opening of the metal molds).

Figure 12:
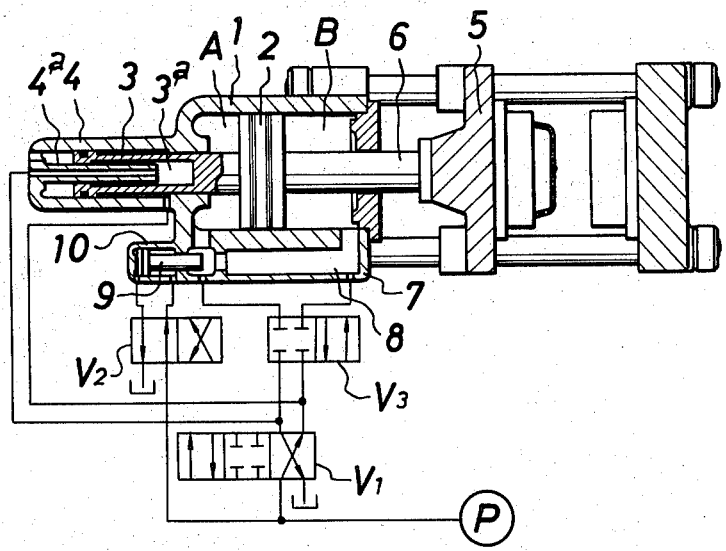

In FIG. 12, the pressurized fluid is introduced merely into the forward chamber in the telescopically constructed high-speed mold shifting cylinder 4, and the metal mold is quickly shifted rearwardly. In this operation, the plunger valve 9 is retracted to communicate the two chambers A and B.

The fourth embodiment of the present invention is indicated in FIGS. 13 through 16. In this embodiment, the diameters of the piston rod 3 and the ram 6 are also equalized as in the case of the third embodiment, and the construction of the high-speed mold shifting cylinder and piston, in combination, is made into similar telescopic construction to that of the third embodiment. However, in the fourth embodiment of this invention, the plunger valve 9 is constructed in such a manner that a piston portion 11 is formed around a hollow shaft having therethrough an axially extended through hole, and the piston portion 11 is slidable within a cylindrical space formed within the cylinder member 10, forming two chambers $a$ and $b$ at opposite sides of the piston portion 11. With the above described construction of the plunger valve 9, the valve 9 can be advanced forwardly or retracted rearwardly whenever the pressurized fluid is introduced into the chamber $a$ or chamber $b$. Furthermore, because of the existence of the axial hole bored through the hollow shaft of the piston 11, the fluid pressure acting against the forward end of the hollow shaft is balanced by the fluid pressure acting against the rear end of the hollow shaft while the plunger valve 9 is operated in the cylindrical member 10.

Since the plunger valve 9 is constructed as described above, with the chambers $a$ and $b$ having the same cross sectional areas, the plunger valve can be moved forwardly and rearwardly at equal speeds, whereby the slow-down times in mold closing and mold opening operations can be thereby equalized.

The operation of the fourth embodiment will now be described briefly with reference to the FIGS. 13 through 16.

Figure 13:
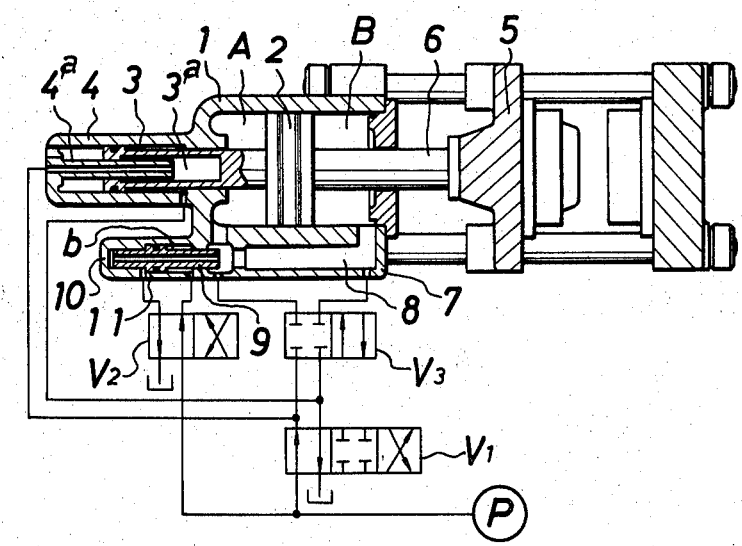
FIGS. 13 through 16 are sectional views showing a fourth embodiment of the invention.

In FIG. 13, the pressurized fluid is introduced into the chamber $b$ of the plunger valve 9 so that the valve 9 is shifted rearwardly thereby to open the oil passage 8, and the chambers A and B in the mold clamping cylinder 1 are communicated with each other through the oil passage 8. The pressurized fluid is also introduced into the hollow space 3a so that the piston 2 together with the metal mold is shifted forwardly at a high speed thereby to close the metal molds.

Figure 14:
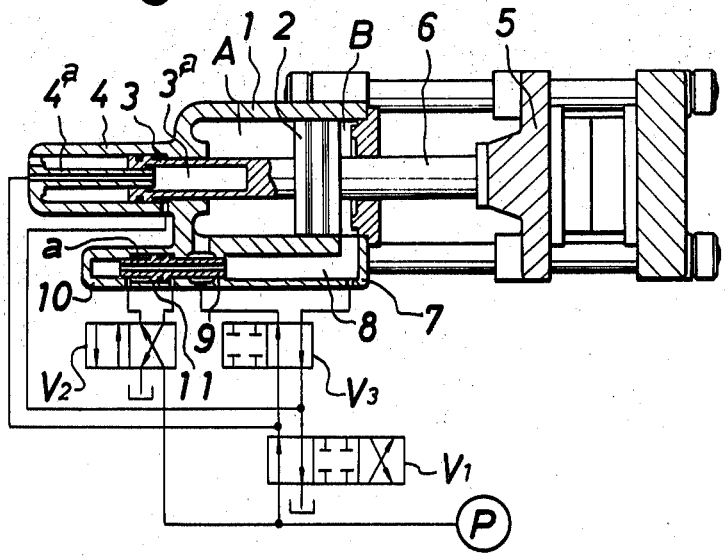

In FIG. 14, the pressurized fluid is now introduced into the chamber $a$ of the plunger valve 9 so that the valve 9 is shifted forwardly to close the oil passage 8. The fluid is also directed into the chamber A so that the metal molds are clamped under a heavy clamping pressure.

Figure 15:
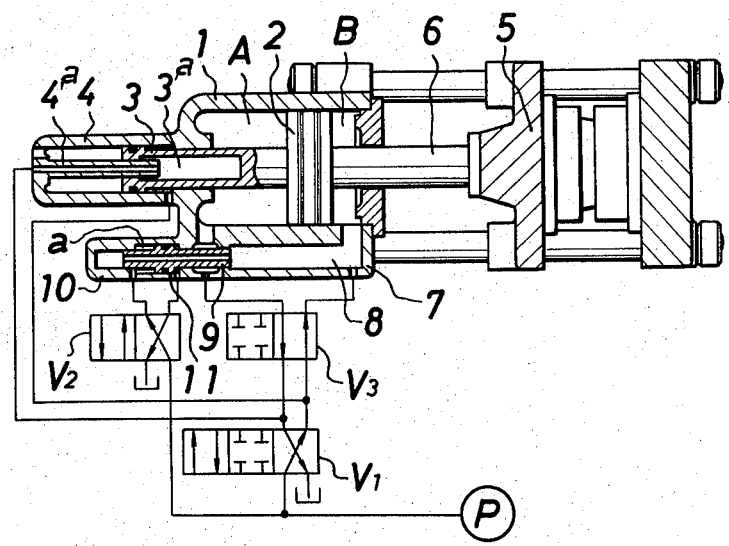

In FIG. 15, the pressurized fluid is introduced into the chamber $a$ of the plunger valve 9, the forward chamber in the high-speed mold shifting cylinder 4, and the chamber B in the mold clamping cylinder 1, whereby the plunger valve 9 closes the oil passage 8 and the metal molds are forced open against the initial resistance in opening the metal molds.

Figure 16:
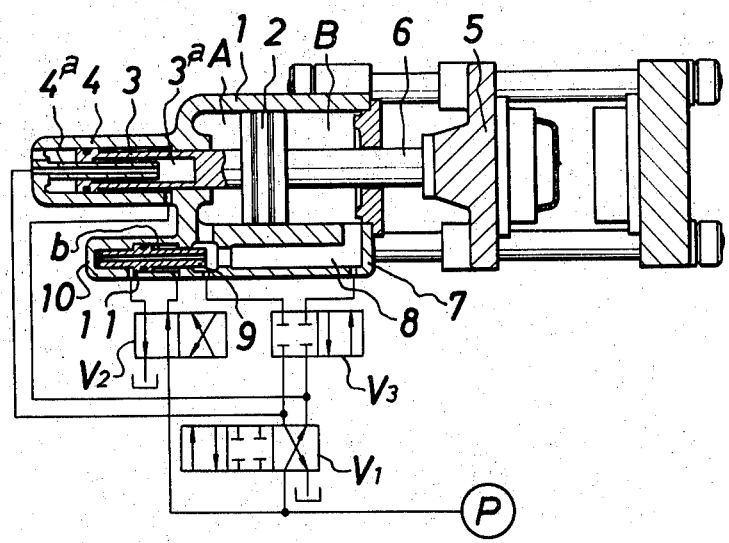

In FIG. 16, the pressurized fluid is introduced into the chamber $b$ of the plunger valve 9, thereby to open the oil passage 8, and into the forward chamber in the high-speed mold shifting cylinder 4, so that the piston 2 is shifted together with the metal mold rearwardly at a high speed.

What is claimed is:

1. In a mold clamping device of hydraulic type having a mold clamping cylinder including a mold clamping piston coupled through a ram portion thereof to a movable plate for supporting a movable mold, and a high-speed mold shifting cylinder including a mold shifting piston associated with said mold clamping piston through a rod portion thereof, the improvement comprising:

A a passage interconnecting two chambers constituting mold opening and closing chambers respectively formed at opposite sides of said mold clamping piston in said mold clamping cylinder;

B a valve located in said passage for opening and closing the passage in accordance with the operation of the mold clamping device; and C said mold opening and closing chambers being connected to hydraulic lines through portions of said passage and selectively in communication therewith upon movement of said valve to passage opening and closing positions.

2. A mold clamping device as claimed in claim 1, the diameter of said ram portion being greater than that of said portion whereby the cross sectional areas of said two chambers in the mold clamping cylinder are different, said high-speed mold shifting piston dividing said mold shifting cylinder into high-speed mold opening and closing chambers, and a hydraulic line connected to said mold opening one of said chambers formed in said high-speed mold shifting cylinder.

3. A mold clamping device as claimed in claim 1, wherein the diameter of said rod portion is greater than that of said ram portion, said rod portion having a hollow, cylindrical space therein, a nozzle having an oil passage therethrough telescopically extending into said space, said mold shifting piston dividing said mold shifting cylinder into high-speed mold opening and closing chambers, a hydraulic line connected to said nozzle, whereby, upon introduction of fluid under pressure into said nozzle, said rod portion is shifted at high speed together with said ram portion to a mold closing position.

4. A mold clamping device as claimed in claim 1, the diameters of said rod portion and said ram portion being equal, said mold shifting piston dividing said mold shifting cylinder into high-speed mold opening and closing chambers, said rod portion having a hollow, cylindrical space therein, a nozzle having an oil passage therethrough and extending into said space, a hydraulic line connected to said nozzle operable to introduce fluid under pressure into said nozzle, whereby said rod portion is shifted at high speed together with said ram portion to a mold closing position, a hydraulic line connected to said high-speed mold opening chamber and operable upon introduction of fluid under pressure into said high-speed mold opening chamber to shift said rod portion at high speed together with said ram portion to a mold opening position.

5. A mold clamping device as claimed in claim 4, said valve including a shaft portion having an axially extended hole therethrough and a piston portion formed around said shaft portion, said valve including a body in which said valve is positioned, said piston portion dividing a cylinder of the valve body into two chambers of equal cross sectional areas, hydraulic lines connected to said two chambers in said valve body for introduction selectively of fluid pressures therein, fluid pressures acting at opposite sides of said piston portion being balanced through said hole in said shaft portion.

* * * * *